US00RE47771E

(19) United States
(12) Reissued Patent
Jahnke

(10) Patent Number: US RE47,771 E
(45) Date of Reissued Patent: Dec. 17, 2019

(54) BLOWOUT PREVENTER WITH LOCKING RAM ASSEMBLY AND METHOD OF USING SAME

(71) Applicant: National Oilwell Varco, L.P., Houston, TX (US)

(72) Inventor: Douglas A. Jahnke, Hockley, TX (US)

(73) Assignee: NATIONAL OILWELL VARCO, L.P., Houston, TX (US)

(21) Appl. No.: 15/792,736

(22) Filed: Oct. 24, 2017

Related U.S. Patent Documents

Reissue of:
(64) Patent No.: 9,169,713
Issued: Oct. 27, 2015
Appl. No.: 13/860,415
Filed: Apr. 10, 2013

U.S. Applications:
(60) Provisional application No. 61/622,458, filed on Apr. 10, 2012.

(51) Int. Cl.
*E21B 33/06* (2006.01)

(52) U.S. Cl.
CPC ..... *E21B 33/062* (2013.01)

(58) Field of Classification Search
CPC ..... E21B 33/062; E21B 33/06; E21B 33/061; E21B 33/063; E21B 33/064
See application file for complete search history.

(56) References Cited

U.S. PATENT DOCUMENTS 3,208,357 A * 9/1965 Allen et al. ..... E21B 33/062 188/67
3,242,826 A 3/1966 Smith
3,272,222 A 9/1966 Allen
3,670,761 A 6/1972 Lerouax
(Continued)

FOREIGN PATENT DOCUMENTS

DE 3317487 11/1984
DE 3317487 A1 11/1984
(Continued)

OTHER PUBLICATIONS

PCT/US2013/036010 International Search Report dated May 20, 2014 (5 p.).

(Continued)

*Primary Examiner* — Catherine S Williams

(74) *Attorney, Agent, or Firm* — Conley Rose, P.C.

(57) ABSTRACT

A lock assembly of a blowout preventer is provided. The blowout preventer includes a ram assembly slidably positionable in the channel and engageable with a tubular. The ram assembly includes a ram block, a ram cylinder, and a ram shaft. The lock assembly includes a lock cylinder and a lock piston. The lock cylinder is operatively connectable to the ram cylinder. The ram shaft has an end slidably extendable into a lock cavity of the lock cylinder. The lock piston is slidably positionable in the lock cylinder and separates the lock cavity into a lock and a closing chamber. The lock piston has a ram surface engageable with the end when the lock piston is in a locked position, and a ram hole therethrough to receive the end when the lock piston is in an unlocked position whereby the ram block is selectively lockable about the tubular.

20 Claims, 11 Drawing Sheets

(56) References Cited

U.S. PATENT DOCUMENTS

| | | | | |
|---|---|---|---|---|
| 3,791,616 | A | | 2/1974 | Lerouax |
| 3,871,613 | A | | 3/1975 | Lerouax |
| 3,918,478 | A | | 11/1975 | Lerouax |
| 3,941,141 | A | | 3/1976 | Robert |
| 3,946,806 | A | | 3/1976 | Meynier, III |
| 4,052,995 | A | | 10/1977 | Ellison |
| 4,076,208 | A | | 2/1978 | Olson |
| 4,188,860 | A | | 2/1980 | Miller |
| 4,253,638 | A | | 3/1981 | Troxell, Jr. |
| 4,290,577 | A | | 9/1981 | Olson |
| 4,305,565 | A | | 12/1981 | Abbe |
| 4,437,643 | A | | 3/1984 | Brakhage et al. |
| 4,438,900 | A | | 3/1984 | Schaeper et al. |
| 4,456,215 | A | | 6/1984 | Bishop et al. |
| 4,492,359 | A | | 1/1985 | Baugh |
| 4,502,534 | A | | 3/1985 | Roche et al. |
| 4,504,037 | A | | 3/1985 | Beam et al. |
| 4,519,577 | A | | 5/1985 | Jones |
| 4,558,842 | A | | 12/1985 | Peil et al. |
| 4,582,293 | A | | 4/1986 | Jones |
| 4,588,842 | A | | 5/1986 | Vanderpool |
| 4,601,232 | A | | 7/1986 | Troxell, Jr. |
| 4,877,217 | A | | 10/1989 | Peil et al. |
| 4,969,390 | A | | 11/1990 | Williams, III |
| 4,969,627 | A | | 11/1990 | Williams, III |
| 5,025,708 | A | | 6/1991 | Smith et al. |
| 5,056,418 | A | | 10/1991 | Granger et al. |
| 5,063,828 | A | | 11/1991 | Kamimura et al. |
| 5,199,683 | A | | 4/1993 | Le |
| 5,217,073 | A | | 6/1993 | Bruns |
| 5,255,890 | A | | 10/1993 | Morrill |
| 5,400,857 | A | | 3/1995 | Whitby et al. |
| 5,505,426 | A | | 4/1996 | Whitby et al. |
| 5,515,916 | A | | 5/1996 | Haley |
| 5,575,452 | A | | 11/1996 | Whitby et al. |
| 5,653,418 | A | | 8/1997 | Olson |
| 5,662,171 | A | | 9/1997 | Brugman et al. |
| 5,735,502 | A | | 4/1998 | Levett et al. |
| 5,897,094 | A | | 4/1999 | Brugman et al. |
| 5,918,851 | A | | 7/1999 | Whitby |
| 5,975,484 | A | | 11/1999 | Brugman et al. |
| 6,006,647 | A | * | 12/1999 | Van Winkle ..... E21B 33/062 91/41 |
| 6,173,770 | B1 | | 1/2001 | Morrill |
| 6,374,925 | B1 | | 4/2002 | Elkins et al. |
| 6,510,897 | B2 | | 1/2003 | Hemphill |
| 6,554,247 | B2 | | 4/2003 | Berckenhoff et al. |
| 6,782,799 | B2 | | 8/2004 | Vincent |
| 6,843,463 | B1 | | 1/2005 | McWhorter et al. |
| 6,857,634 | B2 | | 2/2005 | Araujo |
| 6,969,042 | B2 | | 11/2005 | Gaydos |
| 7,044,430 | B2 | | 5/2006 | Brugman et al. |
| 7,051,989 | B2 | | 5/2006 | Springett et al. |
| 7,051,990 | B2 | | 5/2006 | Springett et al. |
| 7,195,224 | B2 | | 3/2007 | Le |
| 7,243,713 | B2 | | 7/2007 | Isaacks et al. |
| 7,246,666 | B2 | | 7/2007 | Hemphill et al. |
| 7,331,562 | B2 | | 2/2008 | Springett |
| 7,367,396 | B2 | | 5/2008 | Springett et al. |
| 7,798,466 | B2 | | 9/2010 | Springett et al. |
| 7,814,979 | B2 | | 10/2010 | Springett et al. |
| 9,045,961 | B2 | | 6/2015 | Melancon et al. |
| 2004/0021269 | A1 | | 2/2004 | Gaudette et al. |
| 2004/0084644 | A1 | | 5/2004 | Wiedemann |
| 2004/0222020 | A1 | | 11/2004 | Kinder |
| 2004/0222239 | A1 | | 11/2004 | Hayduk |
| 2006/0021749 | A1 | | 2/2006 | Schaeper |
| 2006/0113501 | A1 | | 6/2006 | Isaacks et al. |
| 2006/0169933 | A1 | | 8/2006 | Le |
| 2009/0056132 | A1 | | 3/2009 | Foote |
| 2010/0155080 | A1 | | 6/2010 | Cargaugh et al. |
| 2010/0243926 | A1 | | 9/2010 | Weir |
| 2011/0000670 | A1 | | 1/2011 | Springett et al. |
| 2011/0012311 | A1 | | 1/2011 | McClanahan |

FOREIGN PATENT DOCUMENTS

| | | | |
|---|---|---|---|
| GB | 1352258 | | 5/1974 |
| GB | 1352258 | A | 5/1974 |
| GB | 1352260 | | 5/1974 |
| GB | 1352260 | A | 5/1974 |
| GB | 2100773 | | 1/1983 |
| GB | 2100773 | A | 1/1983 |
| GB | 2154265 | | 9/1985 |
| GB | 2154265 | A | 9/1985 |
| WO | 2012/012192 | A1 | 1/2012 |
| WO | 2012/012193 | A1 | 1/2012 |

OTHER PUBLICATIONS

Office Action dated Jan. 16, 2015, for U.S. Appl. No. 13/860,415 (14 p.).

Response to Office Action dated Jan. 16, 2015, for U.S. Appl. No. 13/860,415; Response filed Apr. 16, 2015 (14 p.).

Supplemental Response to Office Action dated Jan. 16, 2015, for U.S. Appl. No. 13/860,415; Response filed Jul. 1, 2015 (14 p.).

Notice of Allowance dated Jul. 20, 2015, for U.S. Appl. No. 13/860,415 (8 p.).

Amendment After Allowance dated Sep. 24, 2015, for U.S. Appl. No. 13/860,415 (4 p.).

European Office Action dated Aug. 9, 2018, for European Application No. 13717692.1 (4 p.).

European Examination Report dated Jan. 26, 2018, for European Application No. 13717692.1 (4 p.).

International Search Report for PCT Patent Application No. PCT/US2013/036010 dated May 20, 2014, 5 pages.

* cited by examiner

BLOWOUT PREVENTER WITH LOCKING RAM ASSEMBLY AND METHOD OF USING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

This present disclosure relates generally to techniques for performing wellsite operations. More specifically, the present disclosure relates to techniques for preventing blowouts involving, for example, a blowout preventer, ram assembly, a door assembly, and/or a lock.

Oilfield operations may be performed to locate and gather valuable downhole fluids. Oil rigs are positioned at wellsites, and downhole tools, such as drilling tools, are deployed into the ground to reach subsurface reservoirs. Once the downhole tools form a wellbore to reach a desired reservoir, casings may be cemented into place within the wellbore, and the wellbore completed to initiate production of fluids from the reservoir. Downhole tubular devices may be positioned in the wellbore to enable the passage of subsurface fluids to the surface.

Leakage of subsurface fluids may pose an environmental threat if released from the wellbore. Equipment, such as blow out preventers (BOPs), may be positioned about the wellbore to form a seal about a tubular therein to prevent leakage of fluid as it is brought to the surface. BOPs may have selectively actuatable rams or ram bonnets, such as pipe rams or shear rams, that may be activated to seal and/or sever a tubular in a wellbore. Some examples of BOPs are provided in U.S. Patent/Application Nos. 20110000670; U.S. Pat. Nos. 7,814,979; and 7,367,396.

It may be desirable to provide BOPs with various features, such as seals, ram blocks, doors and/or lock mechanisms, etc., for use in wellsite operations. Examples of BOPs and/or features may be provided in patent application Ser. Nos. 13/018,217 (not yet published at the time of filing), US2010/0243926, US2011/0012311, U.S. Pat. Nos. 5,897,094, 7,044,430, 7,051,989, 5,575,452, WO 2012/012192, WO 2012/012193, U.S. Pat. Nos. 7,195,224 and 7,798,466.

SUMMARY

In at least one aspect, the disclosure relates to a lock assembly for a blowout preventer. The blowout preventer includes a housing and a ram assembly. The housing has a bore and a channel therethrough. A tubular is positionable through the bore and engageable therein. The ram assembly is slidably positionable in the channel and engageable with the tubular, and includes a ram block, a ram cylinder, and a ram shaft operatively connecting the ram block to the ram cylinder. The lock assembly includes a lock cylinder and a lock piston. The lock cylinder is operatively connectable to the ram cylinder. The ram shaft has an end slidably extendable into a lock cavity of the lock cylinder. The lock piston is slidably positionable in the lock cylinder and separates the lock cavity into a variable volume lock chamber and a variable volume closing chamber, and is movable between a locked and unlocked position, the lock piston having a ram surface engageable with an end of the ram shaft when the lock piston is in the locked position and has a ram hole therethrough to receive the end of the ram shaft when the lock piston is in the unlocked position whereby the ram block is selectively lockable about the tubular.

The lock assembly may also include a guide piston extending into a guide cavity in the lock piston and slidably engageable therewith, and/or a lock ring slidably positionable in the closing chamber about the lock piston. The lock ring separates the closing chamber into a variable volume ring chamber and a variable volume ring fluid chamber, the ring fluid chamber fluidly connected to a ram chamber in the ram cylinder. The lock assembly may also include a ram piston slidably positionable in the ram cylinder and define the ram chamber therein, the ram chamber having a variable volume. The lock assembly may also include a valve fluidly coupled to the ring chamber to selectively vent fluid therefrom, and/or a valve fluidly coupled to the lock chamber to selectively vent fluid therefrom. The lock assembly may also include a ram piston slidably positionable in the ram cylinder and defining a variable volume ram chamber therein, the ram chamber fluidly connectable to the closing chamber. The lock assembly may also include fasteners operatively connecting the lock cylinder to an end of the ram cylinder.

In another aspect, the disclosure relates to a blowout preventer for sealing about a tubular extending from a wellbore of a wellsite. The blowout preventer includes a housing having a bore and a channel therethrough (with the tubular positionable through the bore and engageable therein), a plurality of ram assemblies slidably positionable in the channel and engageable with the tubular (each of the plurality of ram assemblies comprising a ram block, a ram cylinder, and a ram shaft operatively connecting the ram block to the ram cylinder), and a plurality of locking assemblies for locking the plurality of ram assemblies. Each locking assembly includes a lock cylinder operatively to connectable the ram cylinder (the ram shaft having an end slidably extendable into a lock cavity of the lock cylinder) and a lock piston. The lock piston is slidably positionable in the lock cylinder and separates the lock cavity into a variable volume lock chamber and a variable volume closing chamber. The lock piston is movable between a locked and unlocked position, and has a ram surface engageable with the end of the ram shaft when the lock piston is in the locked position and having a ram hole therethrough to receive the end of the ram shaft when the lock piston is in the unlocked position whereby the ram block is selectively lockable about the tubular.

The blowout preventer may also include a fluid source operatively connectable to the lock chamber and/or the closing chamber, and selectively providing fluid pressure thereto. The blowout preventer may also include an actuator operatively connectable to one of the blowout preventer, the ram assemblies, and/or the lock assemblies for selective activation thereof. The blowout preventer may also include a door positionable about the ram assembly and the channel, and providing selective access thereto.

In another aspect, the disclosure relates to a method of locking a blowout preventer. The blowout preventer includes a housing and a ram assembly. The housing has a bore and a channel therethrough, with the tubular positionable through the bore and engageable therein. The ram assembly is slidably positionable in the channel and engageable with the tubular. The ram assembly includes a ram block, a ram cylinder, and a ram shaft operatively connecting the ram block to the ram cylinder. The method involves providing the lock assembly about the ram assembly and selectively locking the ram block about the tubular by selectively applying pressure to one of the lock chamber and the closing chamber.

The lock assembly may also include a guide piston extending into a cavity in the lock piston and slidably engageable therewith and a lock ring slidably positionable in the closing chamber about the lock piston. The method may involve increasing a force of the lock piston by slidably moving the lock ring adjacent the lock piston. The method may also involve selectively venting fluid from the lock chamber and/or the closing chamber and/or moving the ram block by fluidly coupling the closing chamber to a ram chamber in the ram cylinder to selectively drive a ram piston therein.

The disclosure may also relate to a blowout preventer for sealing about a tubular. The blowout preventer includes a housing, a ram assembly and a lock assembly. The lock assembly selectively locks the ram assembly in a sealed position and includes a locking cylinder, a locking piston, and a locking ring. The locking piston is positionable in the locking cylinder to define a lock chamber and a closing chamber, and is slidably movable between an unlocked position that permits the ram shaft to move to a retracted position and a locked position that prevents the ram shaft from moving to the retracted position. The locking ring is slidably positionable in the closing chamber between a piston position adjacent the piston and a chamber position a distance therefrom. When in the piston position, the locking ring increases a force required to move the locking piston to the locked position.

The disclosure may also relate to a method of sealing a tubular involving providing a blowout preventer including a housing having a bore and a channel therethrough, the tubular positionable through the bore, a ram assembly slidably movable through the channel of the housing (the ram assembly including a ram block having a ram shaft extending therefrom and slidably movable within a ram cylinder, the ram block sealingly engageable with the tubular), and a lock assembly for selectively locking the ram assembly in a sealed position. The lock assembly includes a locking cylinder, a locking piston positionable in the locking cylinder to define a lock chamber and a closing chamber (the locking piston is slidably movable between an unlocked position to permit the ram shaft to move to a retracted position and a locked position to prevent the ram shaft from moving to the retracted position), and a locking ring slidably positionable in the closing chamber between a piston position adjacent the piston and a chamber position a distance therefrom such that, when in the piston position, the locking ring increases a force required to move the locking piston to the locked position. The method may also involve positioning a tubular through the bore of the housing, and selectively locking the ram blocks in a sealed position by selectively pressurizing the lock and the closing chambers.

BRIEF DESCRIPTION OF THE DRAWINGS

So that the above recited features and advantages of the present disclosure can be understood in detail, a more particular description of the disclosure, briefly summarized above, may be had by reference to the embodiments thereof that are illustrated in the appended drawings. It is to be noted, however, that the appended drawings illustrate only typical embodiments and are, therefore, not to be considered limiting of its scope. The figures are not necessarily to scale and certain features, and certain views of the figures may be shown exaggerated in scale or in schematic in the interest of clarity and conciseness.

FIGS. 4A-1 through 4H-1 are horizontal cross-sectional views of a portion of a BOP and FIGS. 4A-2 through 4H-2 are vertical cross-sectional views of the portion of the BOP, depicting sequential operation of a lock assembly of a ram assembly.

DETAILED DESCRIPTION OF THE INVENTION

The description that follows includes exemplary apparatus, methods, techniques, and/or instruction sequences that embody techniques of the present subject matter. However, it is understood that the described embodiments may be practiced without these specific details.

Blowout preventers (BOPS) may be positioned about a tubular and provide a seal therewith, for example, during a blowout. The BOPs may be provided with ram blocks for sealing with and/or severing the tubular. The ram blocks may be reciprocated by extending and retracting a ram shaft in a ram cylinder. The ram assembly may be selectively locked in a sealed position with a lock assembly. The lock assembly may include a locking piston slidably positionable in a locking chamber and provided with a locking ring to control movement thereof. The lock assembly may be selectively pressurized to control the locking of the ram assembly.

Figure 1:
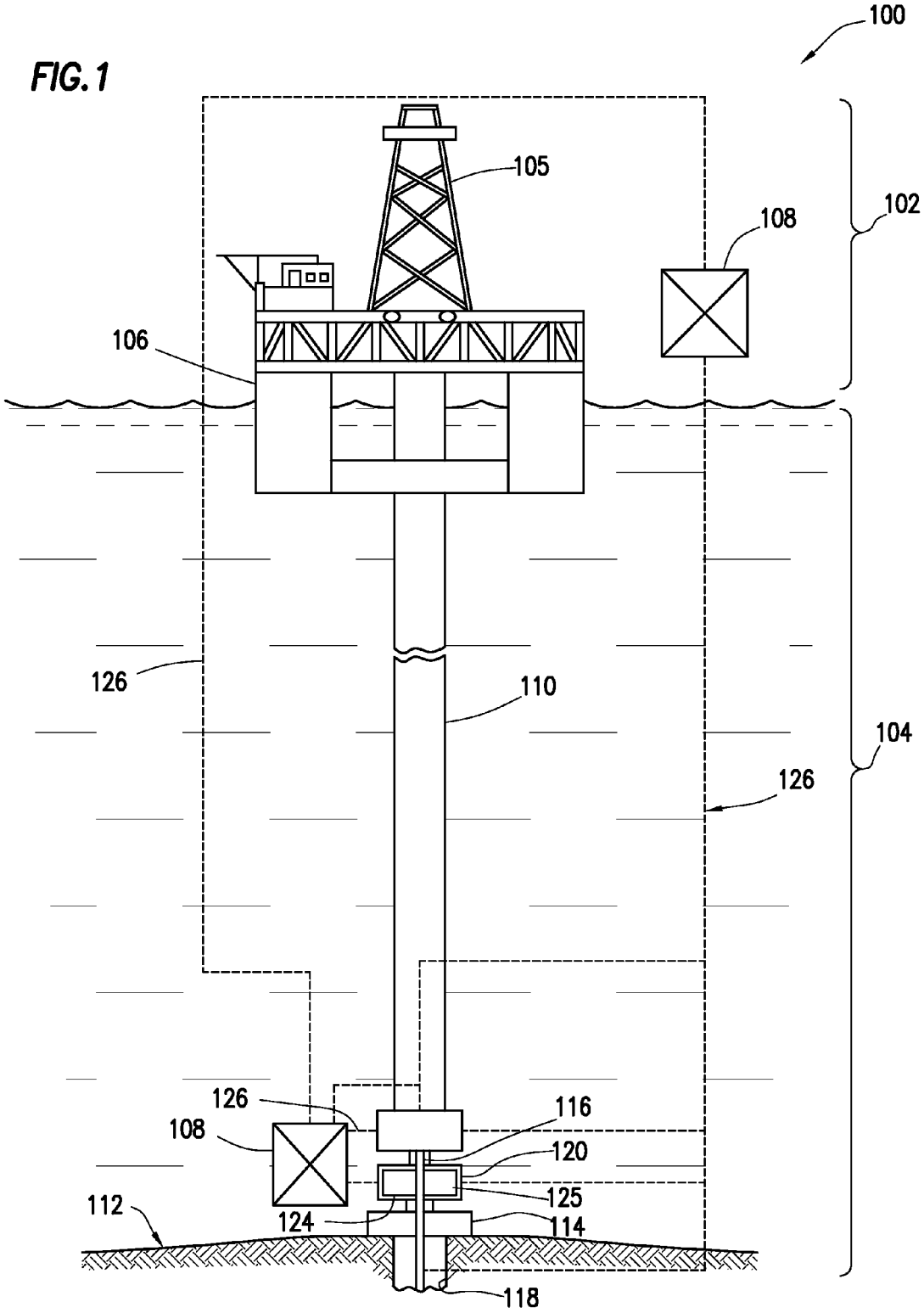
FIG. 1 depicts a schematic view of an offshore wellsite having a blowout preventer (BOP) with a ram assembly with a lock assembly.

FIG. 1 depicts an offshore wellsite 100 having a subsea system 104 and a surface system 102. The surface system 102 may be used to facilitate the oilfield operations at the offshore wellsite 100. The surface system 102 may include a rig 105, a platform 106 (or vessel) and a controller 108.

The subsea system 104 includes a conduit (e.g., riser) 110 extending from the platform 106 to a sea floor 112. The subsea system further includes a wellhead 114 with a tubular 116 extending into a wellbore 118, a BOP 120 and a controller 108. The BOP 120 has various BOP components, such as a ram assembly 124 for shearing the tubular 116 and sealing the wellbore 118. The ram assembly 124 is engageable with the tubular 116 to form a seal about the tubular and/or to sever or cut the tubular 116. The ram assembly 124 has a lock assembly 125 for selectively locking the ram assembly 124 to prevent movement thereof, for example, to maintain the ram assembly 124 in a sealed position about the tubular 116.

The surface system 102 and subsea system 104 may be provided with one or more controllers 108 located at various locations to control the surface system 102 and/or the subsea system 104. Communication links 126 may be provided for communication between the controllers 108 and various parts of the wellsite 100.

Although the BOP 120 is described herein as being used in subsea operations, it will be appreciated that the wellsite 100 may be land or water based, and the BOP 120 and/or lock assembly 125 may be used in any wellsite environment. The BOP 120 may sever and/or seal a tubular device, such as tubular 116. ;Tubular devices' as used herein refers to tubular members or devices, such as pipes, certain downhole tools, casings, drill pipe, liner, coiled tubing, production tubing, wireline, slickline, or other tubular members positioned in the wellbore, and associated components, such as drill collars, tool joints, drill bits, logging tools, packers, and the like (referred to as 'tubulars' or 'tubular strings').

Figure 2:
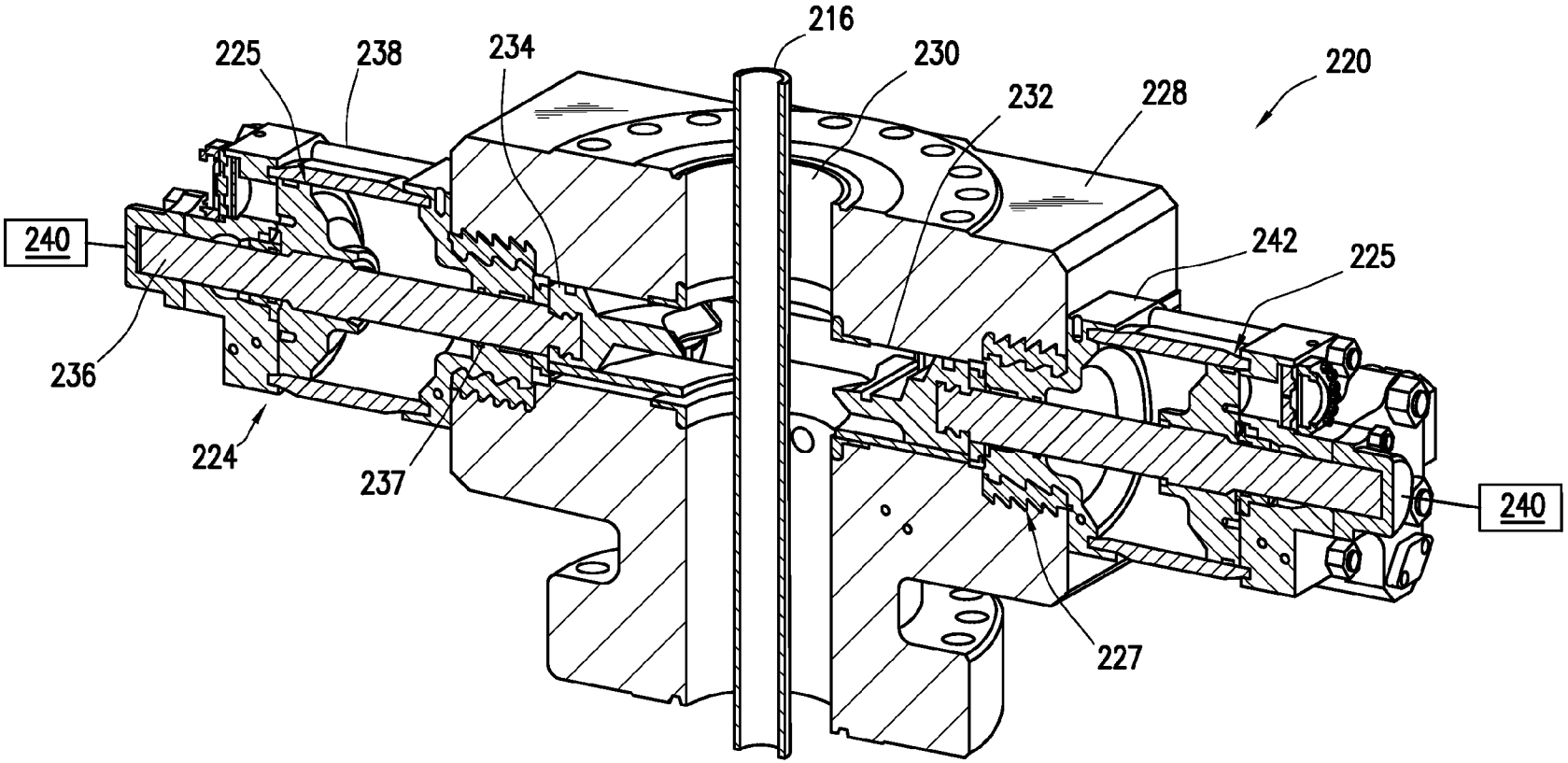
FIG. 2 depicts a vertical cross-sectional view of a BOP with a ram assembly with a lock assembly.

FIG. 2 depicts a longitudinal cross-sectional view of a BOP 220 in an unsealed position. FIG. 2 depicts the ram assembly and lock assembly in greater details. The ram assembly is movable in the BOP 220 to a sealed position (not shown). The BOP 220 includes a housing 228 with a bore 230 and a channel 232 therethrough. The BOP 220 also includes a ram assembly 224 and a lock assembly 225. The ram assembly 224 includes a ram block 234, a ram shaft 236 a ram cylinder 238 and an actuator 240. The ram shaft 236 extends through a passageway 237 through the ram assembly 224. The lock assembly 225 is also provided to lock the ram assembly 224 about tubular 216 in position as will be described further herein.

The BOP of FIG. 2 is depicted with two opposing ram assemblies 224, but any number may be provided. The ram assemblies 224 may be activated to converge about the tubular 216 to seal and/or sever therewith as indicated by the arrows. The ram block 234 may seal with and/or sever a tubular 216. An example of a ram assembly usable with the BOP are described in U.S. Pat. No. 5,735,502. A door assembly 227 may also optionally be included with a door 242 to provide access to the channel 232 and the components of the BOP 220. The ram shaft 236 extends through the door 242 with the ram cylinder 238 external thereto.

Figure 3:
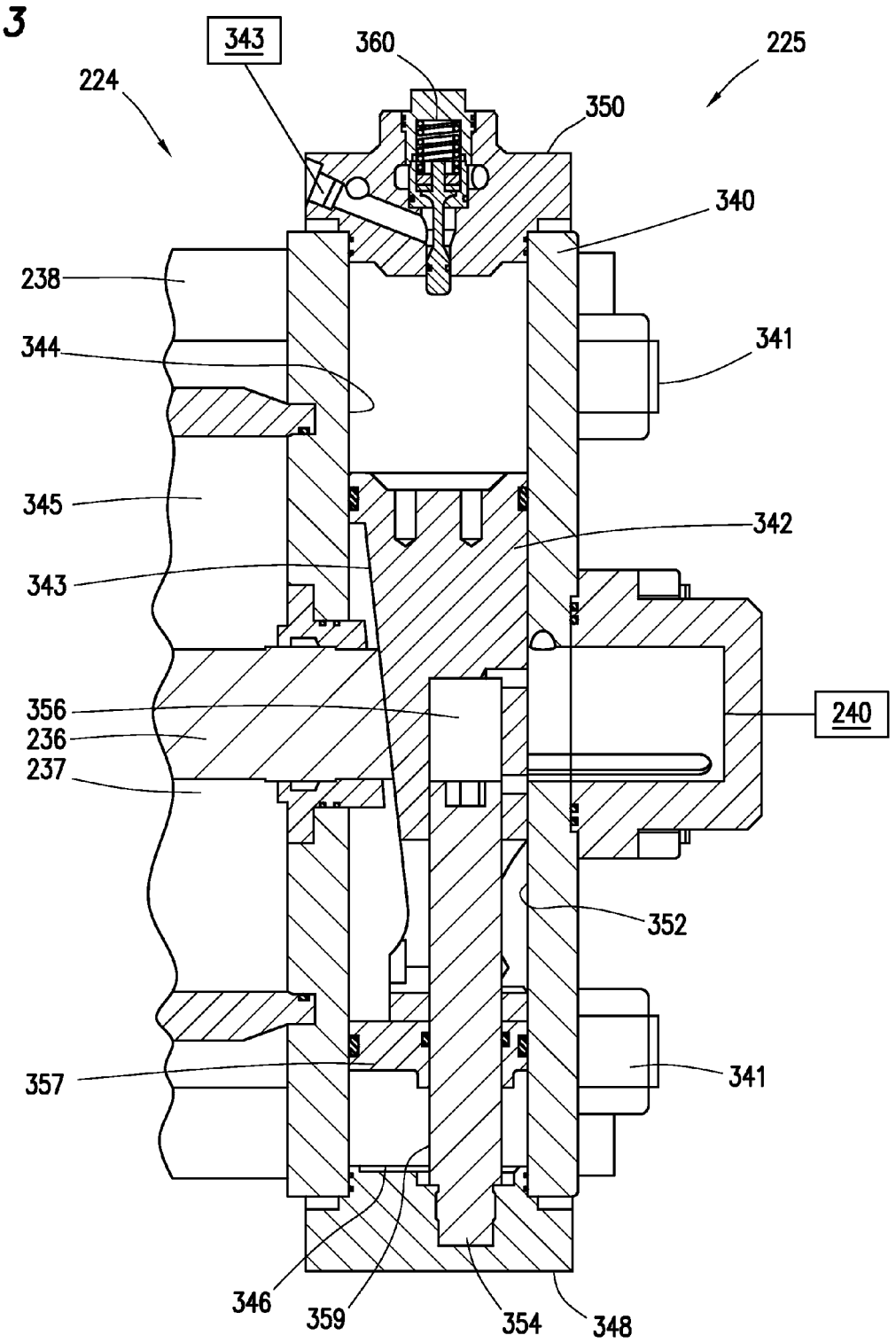
FIG. 3 depicts a horizontal cross-sectional view of a portion of a BOP depicting a lock assembly therein.

FIG. 3 depicts a horizontal cross-sectional view of a portion of a ram assembly of a BOP, such as the BOP 220 of FIGS. 2A and 2B, depicting the lock assembly 225 in greater detail. The lock assembly 225 includes a locking cylinder 340 with a locking piston 342 slidably positioned therein. The lock assembly 225 may be secured in position with fasteners, such as bolts 341. The locking piston 342 has a lock chamber 344 and a closing chamber 346 on either side thereof. Each of these chambers is of a variable dimension that changes as the piston 342 reciprocates within the locking cylinder 340. A ram chamber 345 is positioned in the ram cylinder 238 outside the lock assembly 225, and is in fluid communication with the closing chamber 346.

The locking piston 342 is movable between a locked position adjacent a locked end 348 and an unlocked position adjacent an unlocked end 350. When moved to the locked position, the piston 342 blocks the passageway 237, and prevents the ram shaft 236 from moving to a retracted position away from the tubular 216 (see, e.g., FIG. 2). In the locked position, the piston 342 may also press against the ram shaft 236 to maintain the ram block 234 in a sealed position about the tubular 216 (see, e.g., FIG. 2). The locking piston 342 may be provided with an inclined contact surface 343 for slidingly engaging an end of the ram shaft 236.

The locking piston 342 has a passage 352 therethrough for receiving an end of the ram shaft 236. When moved to the unlocked position, the passage 352 is aligned with the ram shaft 236 to permit passage of the ram shaft 236 therethrough. The ram shaft 236 may move a distance through the locking piston 342. In the unlocked position, the piston 342 may move to a retracted (or unsealed) position such that the ram block 234 is a distance from the tubular 216 (see, e.g., FIG. 2A).

The lock assembly 225 may also be provided with a guide piston 354. The locking piston 342 has a guide cavity 356 therein shaped to slidingly receive the guide piston 354. The guide piston 354 may be used to guide the travel of the locking piston 342 through the locking cylinder 340.

The lock assembly 225 may also be provided with a locking ring 357 having an aperture 359 therethrough for receiving and slidingly engaging the guide piston 354. The locking ring 357 is slidably positionable along the guide piston 354 between a piston position adjacent locking piston 342 and a distance therefrom adjacent lock end 348. The locking ring 357 may be selectively moved by manipulating the pressures in the locking chamber 344, closing chamber 346 and positioning locking piston 342.

The position of the locking ring 357 may be used to selectively resist movement of the locking piston 342. For example, when the locking ring 357 is positioned adjacent the locking piston 342, the locking ring 357 increases the force and/or the pressure in lock chamber 344 required to move the locking piston 342. In another example, when the locking ring 357 is positioned a distance from the locking piston, the force required to move the locking piston 342 does not increase. In this manner, the locking ring 357 may be used to adjust the movement of the locking piston 342.

The actuator 240 may include a pressure source for selectively applying pressure to the locking chamber 344, closing chamber 346 and/or the ram chamber 345. The actuator 240 may also include a controller, sensor or other electronics. Optionally, the lock assembly 225 may be operated without an external pressure source. Valve 360 is provided to selectively vent ram chamber 345. Other fluid control devices, such as an external pressure source, may optionally be provided to manipulate the pressure differentials and control operation of the lock assembly 225.

Figures 2, 4A:
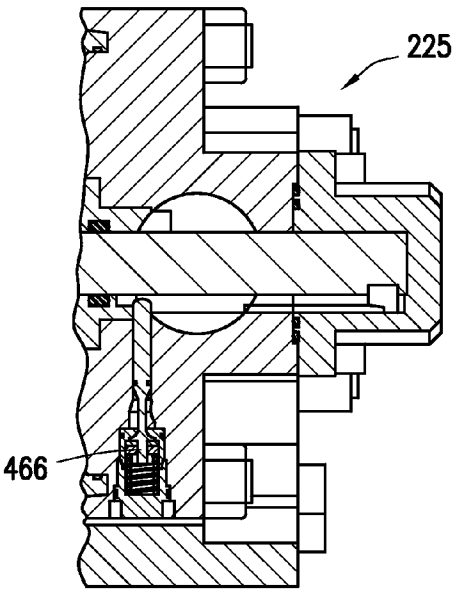
Figures 1, 4A:
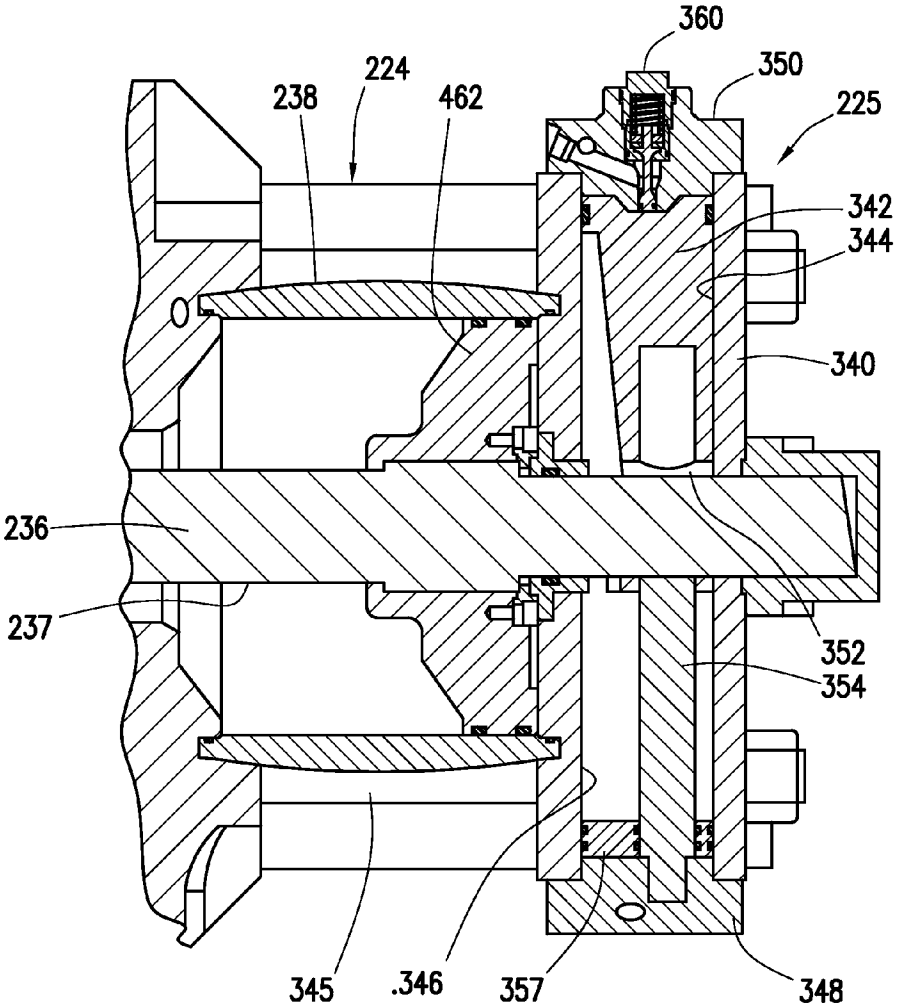
Figures 2, 4B:
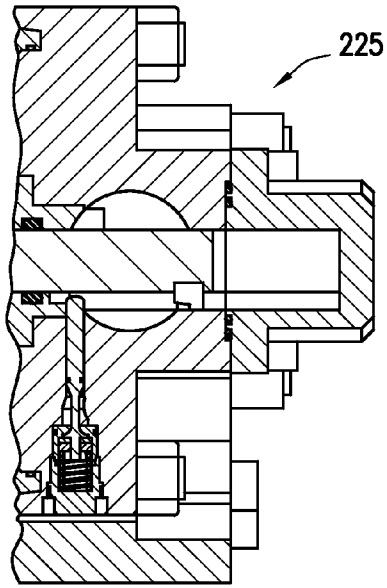
Figures 1, 4B:
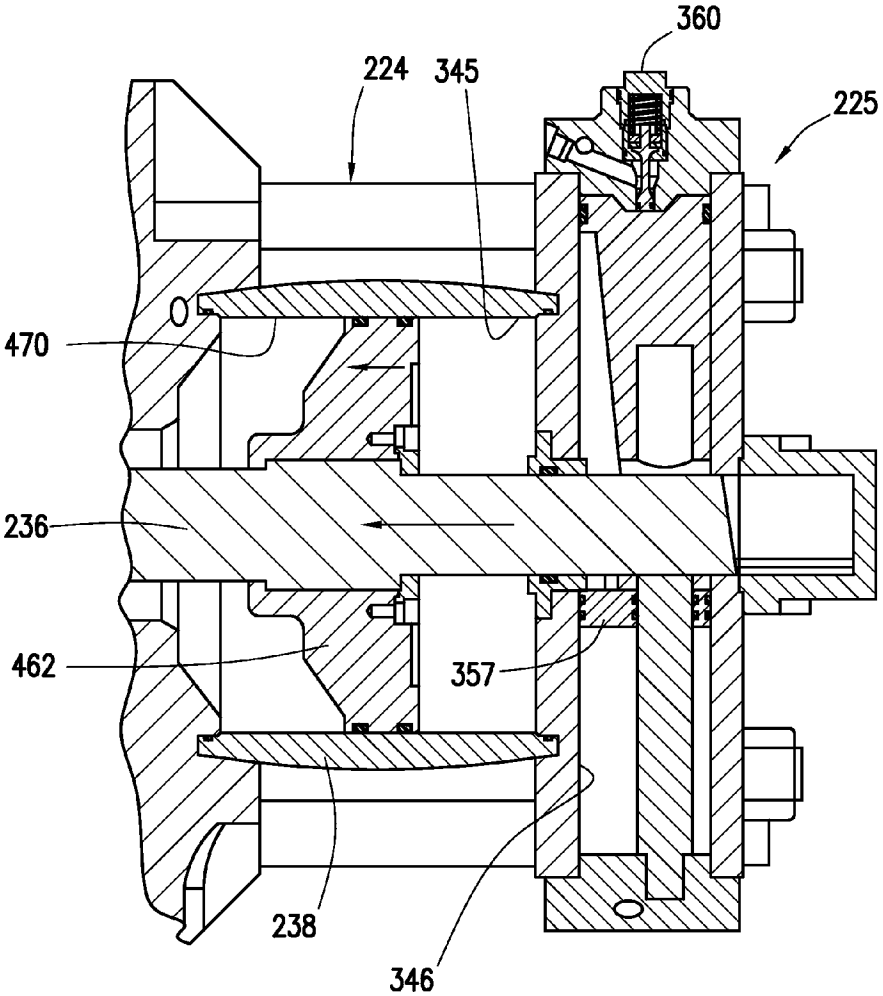
Figures 2, 4C:
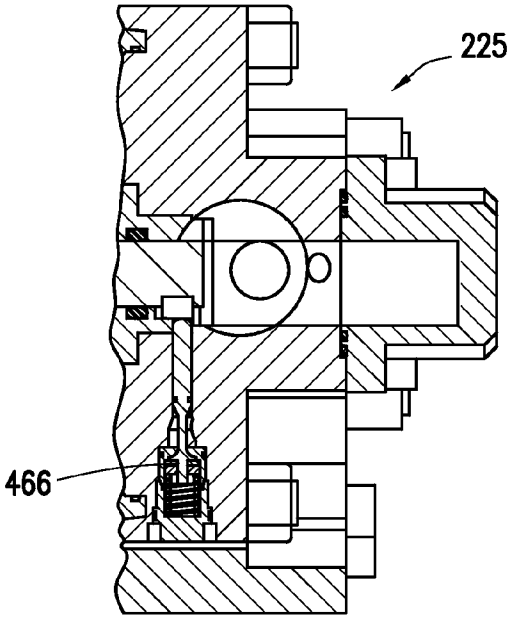
Figures 1, 4C:
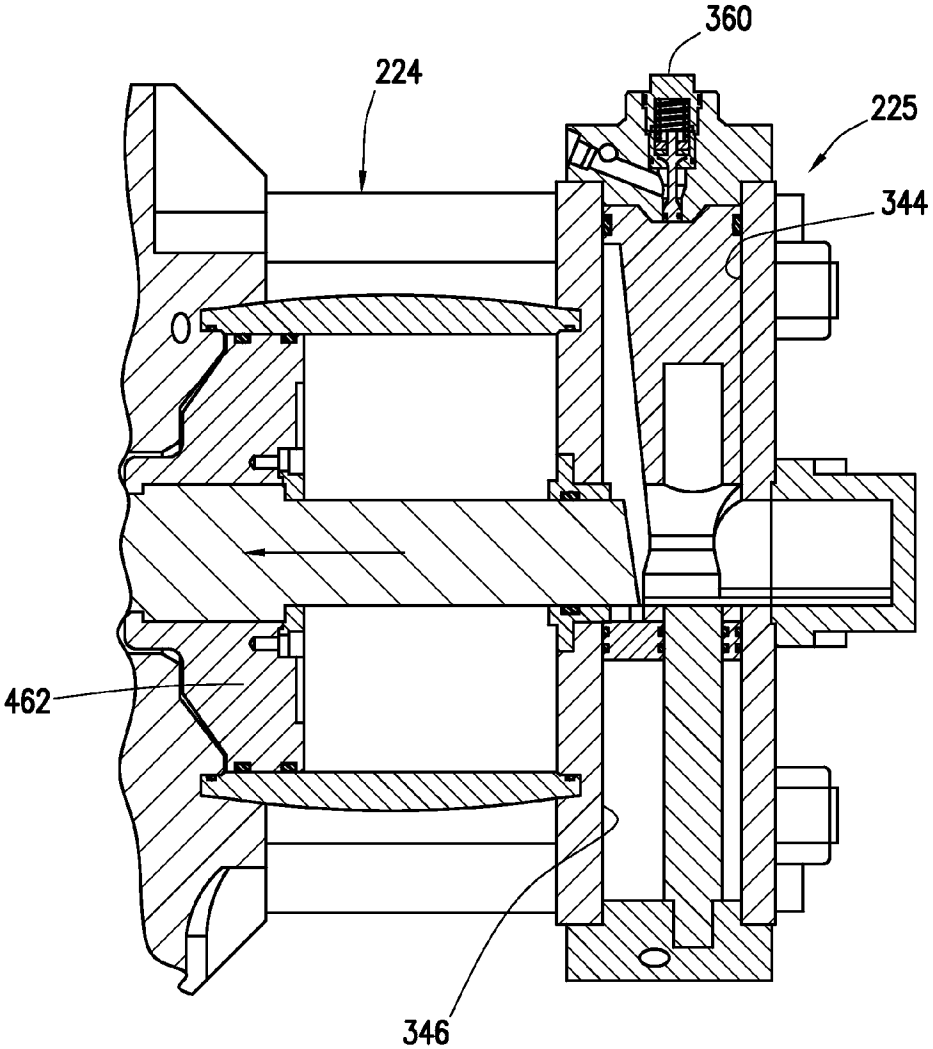
Figures 2, 4D:
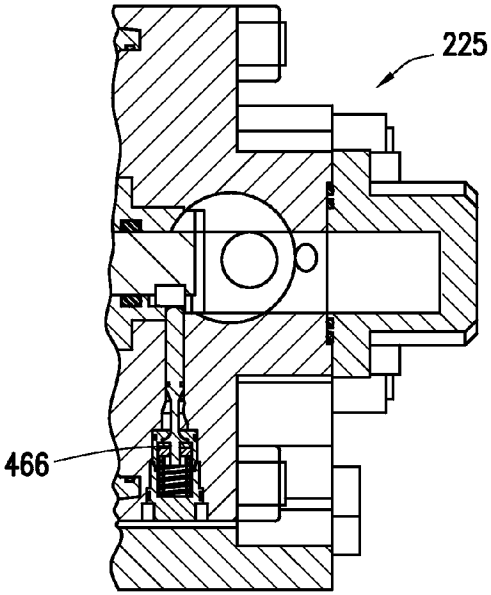
Figures 1, 4D:
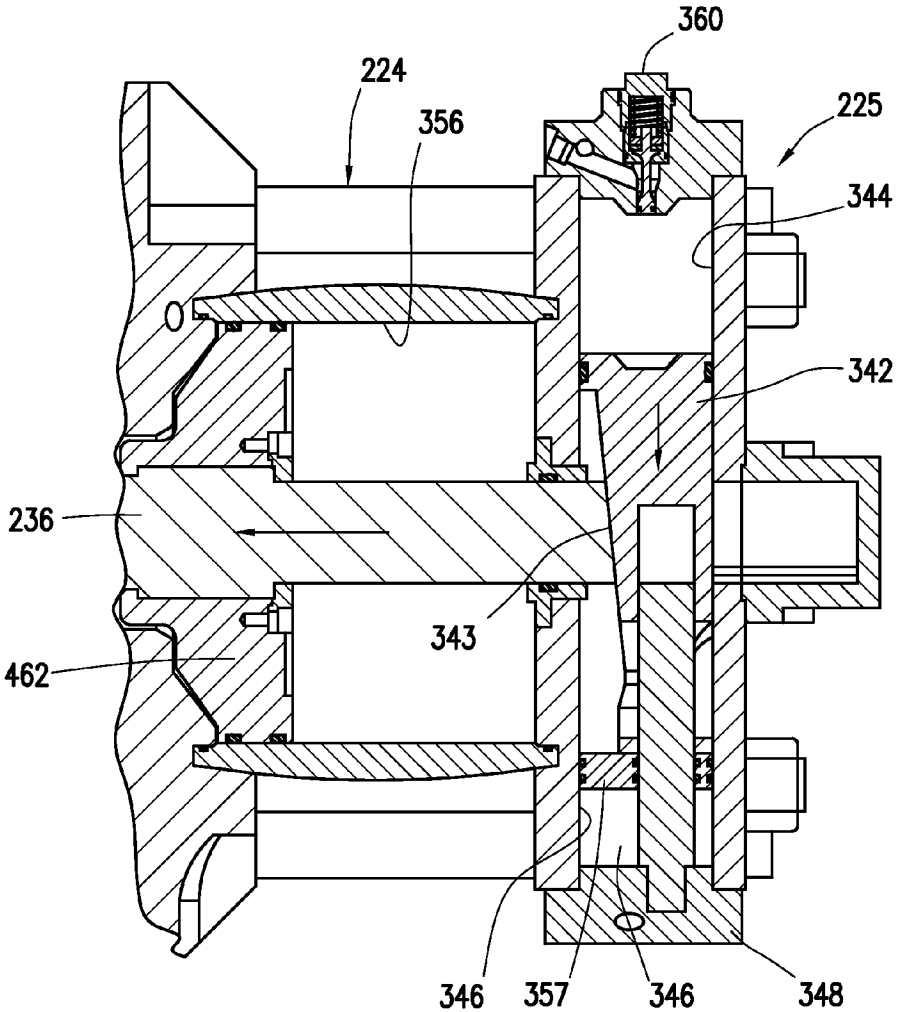
Figures 2, 4E:
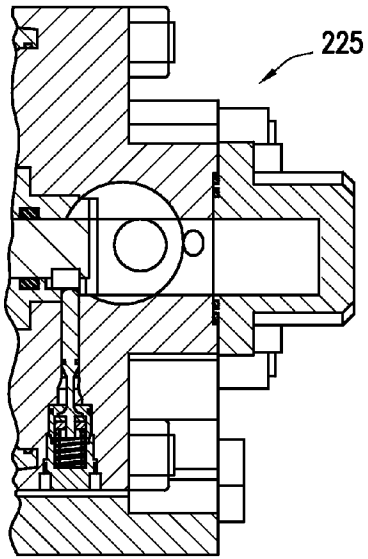
Figures 1, 4E:
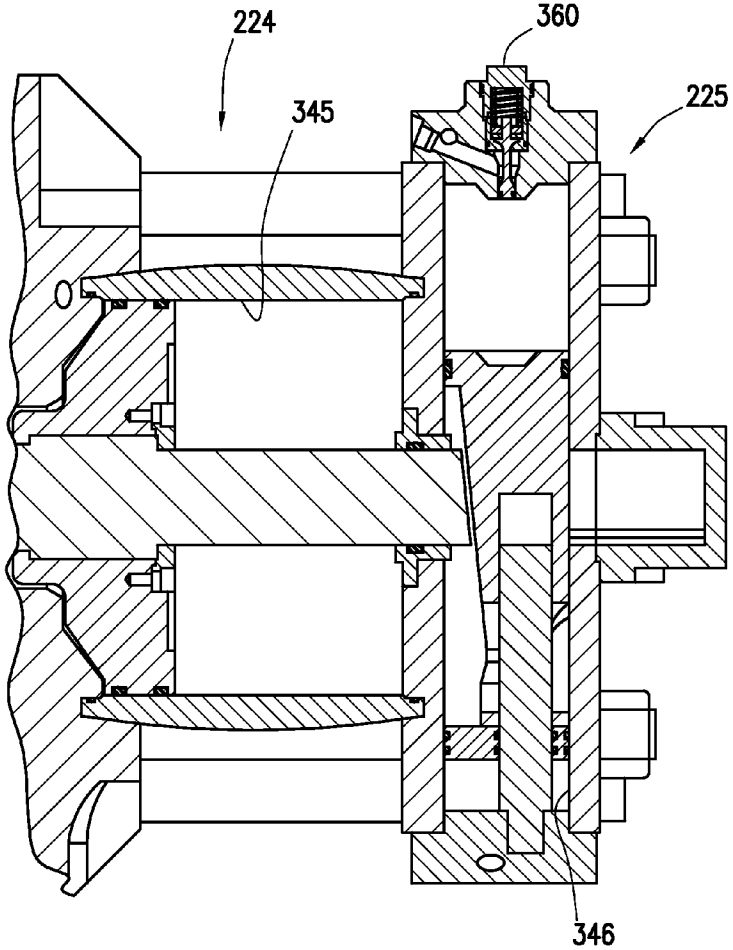
Figures 2, 4F:
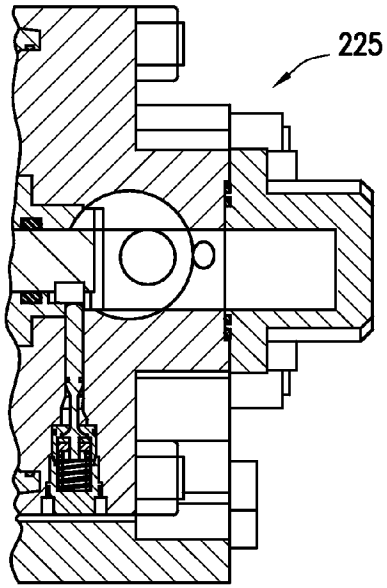
Figures 1, 4F:
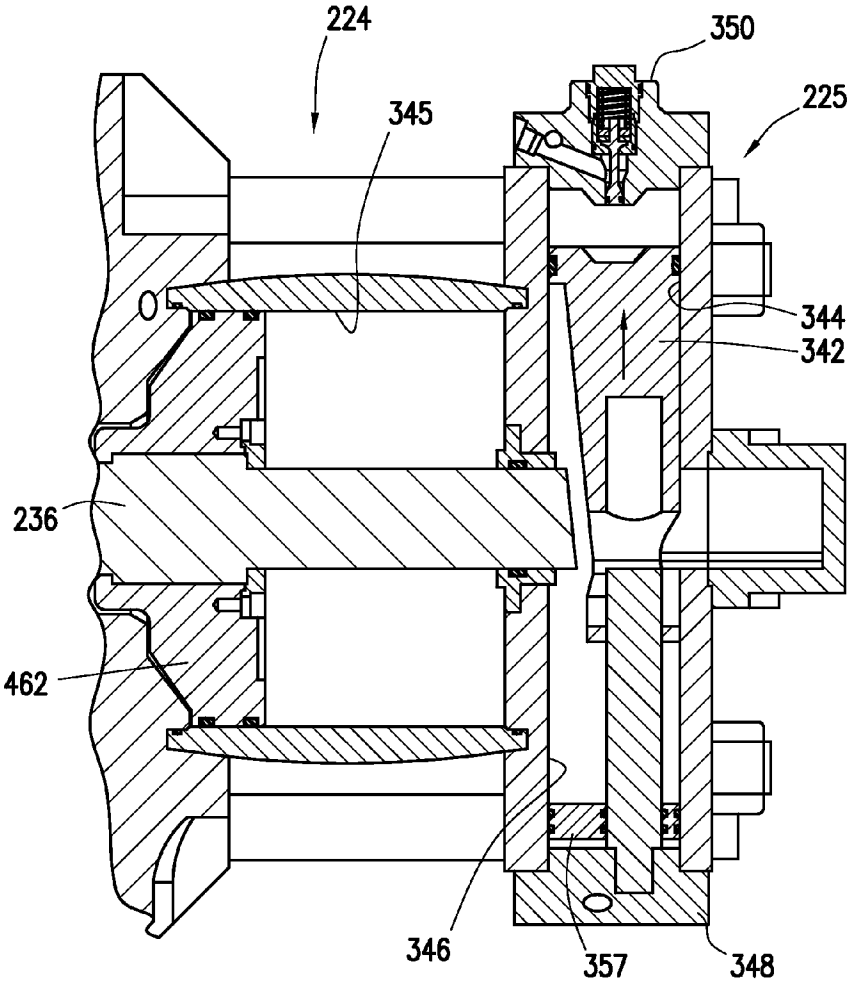
Figures 2, 4G:
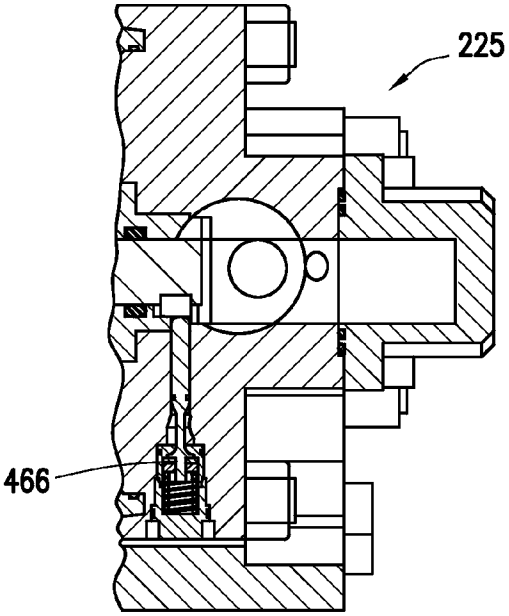
Figures 1, 4G:
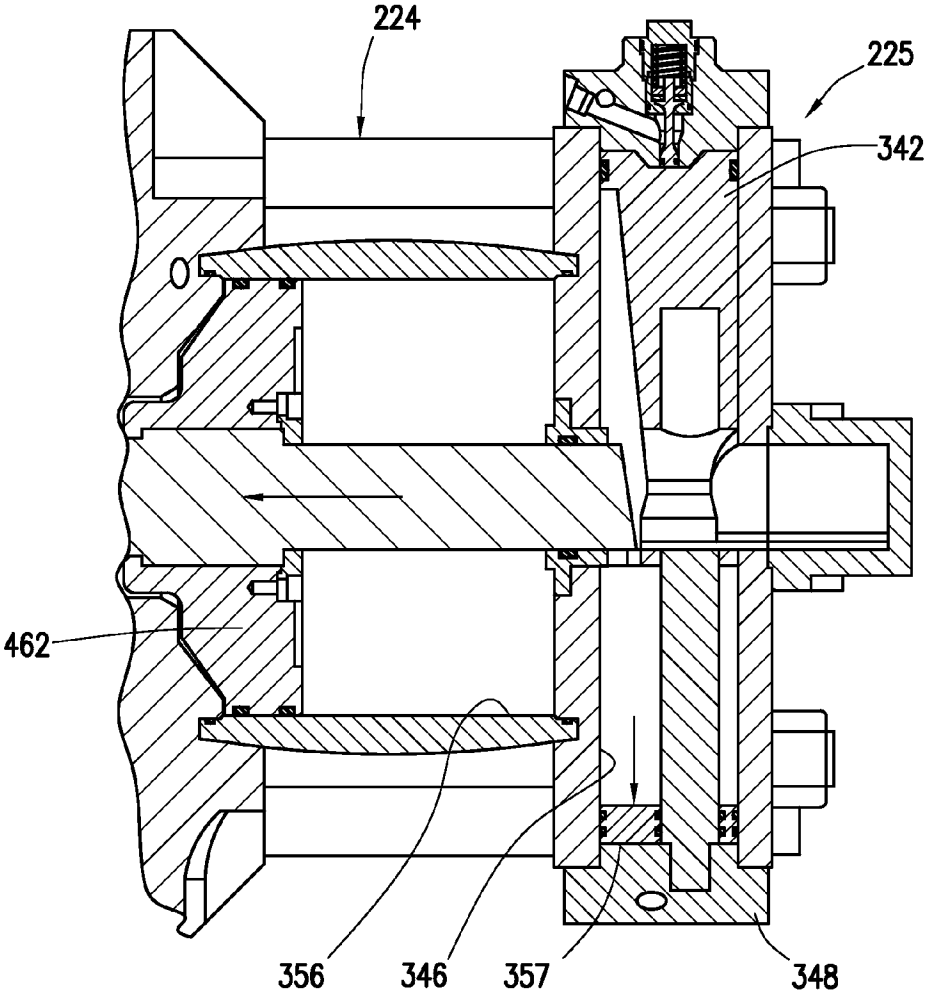
Figures 2, 4H:
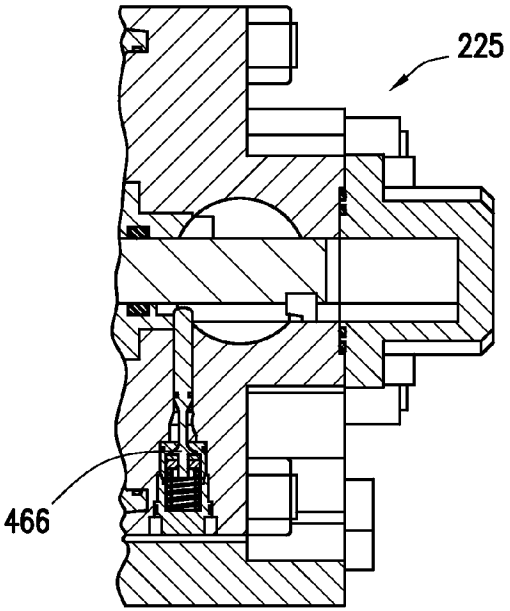
Figures 1, 4H:
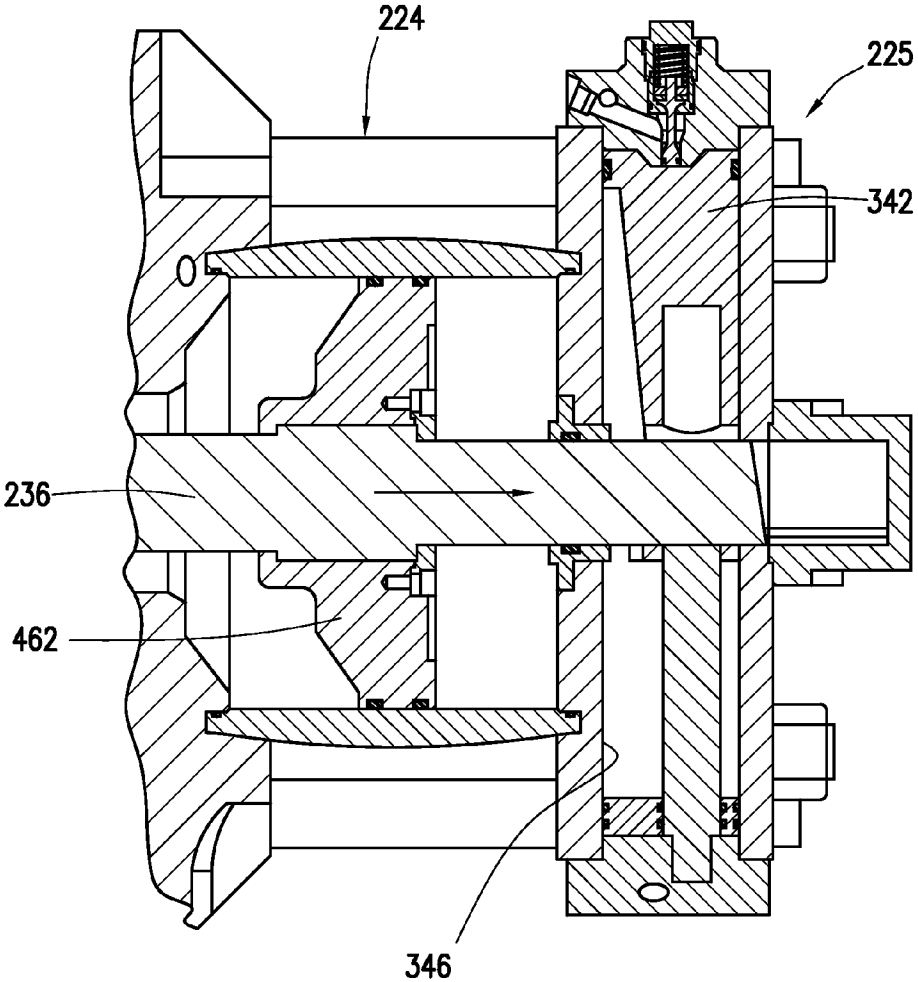

FIGS. 4A-1 and 4A-2 through 4H-1 and 4H-2 depict a sequential operation of the ram assembly 224 and the lock assembly 225. FIGS. 4A-1 through 4H-1 depict horizontal cross-sectional views of the ram assembly 224 and lock assembly 225. FIGS. 4A-2 through 4H-2 depict vertical cross-sectional views of the ram assembly 224 and lock assembly 225. Each of these figures depicts the ram shaft 236 moving through passageway 237 between a sealed and unsealed (or retracted) position about tubular 216 (see, e.g., FIG. 2), and the locking piston 342 moving between a locked and unlocked position in locking cylinder 340. FIGS. 4A-1 through 4H-1 also show a ram piston 462 slidably positionable in the ram cylinder 238 for selectively changing a volume of the ram chamber 345. A second valve 466 is also visible in FIGS. 4A-2 through 4H-2 for selectively releasing or inputting pressure into the locking chamber 344.

Starting with FIGS. 4A-1 and 4A-2, the lock assembly 225 is in a closed position. In these figures, the ram shaft 236 is moved to a retracted position extending through passage 352 of locking piston 342. The locking piston 342 is moved to the unlocked position adjacent an unlocked end 348. The locking ring 357 is a distance from the locking piston 342 and adjacent the lock end 350. Valve 360 is open to vent closing chamber 346 as indicated by the dashed arrow, and valve 466 is in a closed position.

At FIG. 4B-1 and 4B-2, the ram shaft 236 begins to move to the sealed position as indicated by the arrow. Ram piston 462 begins to moves to an expanded position in ram cylinder 238. The ram shaft 236 moves with the ram piston 462 and is advanced towards the tubular 216. The locking ring 357 moves to the piston position adjacent locking piston 342. Fluid fills chamber 470 between piston 462 and the lock assembly 225, and chamber 346.

At FIG. 4C-1 and 4C-2, the ram shaft 236 and ram piston 462 continue to move to the sealed position as indicated by the arrow. Valve 466 is then moved to an open position and begins to [vent] *input pressure into* the locking chamber 344.

At FIG. 4D-1 and 4D-2, because the piston area of the locking piston 342 adjacent the locking chamber 344 is greater than the piston area of the locking piston 342 adjacent to the closing chamber 346, the locking piston 342 begins to move to the unlock end 348 as indicated by the arrow, and the locking chamber 344 fills with fluid. The locking ring 357 is carried by the locking piston 342 as it travels. The contact surface 343 slidingly engages the ram shaft 236 and urges the ram shaft 236 toward the sealed position. The volume of the locking chamber 344 is increasing in size as the volume of the closing chamber 346 reduces. The volume of the guide cavity 356 is [also increased] *decreased* as the locking piston 342 slidingly receives the guide piston 354. Valves 360 and 466 remain [open]. Valve 466 continues to [vent] *input pressure into* the locking chamber [as indicated by the dashed arrow] *344*.

At FIG. 4E-1 and 4E-2, shows the lock assembly 225 in a locked and vented position with no opening or closing pressure applied thereto. With everything vented, a spring force moves valve 360 to the closed position. At FIG. 4F-1 and 4F-2, the locking chamber 344, closing chamber 346 and ram chamber 345 are vented. The locking piston 342 moves toward the [lock] *unlock* end 350 and the locking ring 357 moves toward the [unlock] *lock* end 348. Pressure in the closing chamber 346 and the ram chamber 345 apply pressure P to the ram shaft 236 to remain in the sealed position. The pressure may be, for example, about 3000 psi (210.97 kg/cm).

At FIG. 4G-1 and 4G-2, locking ring 357 moves adjacent to the [unlock] *lock* end 348 and the locking piston 342 moves adjacent the [lock] *unlock* end 350. The locking piston 342 presses against valve 360 and moves it to an open position [as indicated by the arrows to release pressure from closing chamber 346]. Valve 466 is under pressure and remains open to vent the locking chamber 344.

At FIG. 4H-1 and 4H-2, the ram shaft 236 begins to pass through the passage 352 in the locking piston 342 and moves to the retracted position as indicated by the arrow. Ram piston 462 also moves toward locking piston 342. Valve 466 remains open to vent from locking chamber 344.

The process may be varied by manipulating pressures in the locking, unlocking and closing chambers. The actuator may be provided with electronics, such as a controller, processor, data storage, etc. to selectively operate the BOP, lock assembly and/or ram assembly.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the disclosure may also be configured to perform the described functions (via appropriate hardware/software) solely on site and/or remotely controlled via an extended communication (e.g., wireless, internet, satellite, etc.) network.

While the embodiments are described with reference to various implementations and exploitations, it will be understood that these embodiments are illustrative and that the scope of the inventive subject matter is not limited to them. Many variations, modifications, additions and improvements are possible. For example, one or more ram assemblies may be provided with a lock assembly with various fluid activated pistons in various configurations for selectively locking the ram assembly in the sealed and unseal position. The lock assemblies may be positioned about the ram assembly, and be made integral therewith or independent therefrom.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A lock assembly for a blowout preventer of a wellsite having a tubular extending from a wellbore, the blowout preventer comprising a housing and a ram assembly, the housing having a bore and a channel therethrough, the tubular positionable through the bore and engageable therein, the ram assembly slidably positionable in the channel and engageable with the tubular, the ram assembly comprising a ram block, a ram cylinder, and a ram shaft operatively connecting the ram block to the ram cylinder, the lock assembly comprising:

a lock cylinder operatively connectable to the ram cylinder, the ram shaft having an end slidably extendable into a lock cavity of the lock cylinder;

a lock piston slidably positionable in the lock cylinder and separating the lock cavity into a variable volume lock chamber and a variable volume closing chamber, the lock piston movable between a locked and unlocked position, the lock piston having a ram surface engageable with the end of the ram shaft when the lock piston is in the locked position and having a ram hole therethrough to receive the end of the ram shaft when the lock piston is in the unlocked position whereby the ram block is selectively lockable about the tubular; and a ram valve triggered upon abutment with a ram shaft to selectively [vent] *input pressurized* fluid [from] *into* the variable volume lock chamber.

2. The lock assembly of claim 1, further comprising a guide piston extending into a guide cavity in the lock piston and slidably engageable therewith.

3. The lock assembly of claim 2, further comprising a lock ring [slidably positionable in the closing chamber about the lock piston] *moveably disposed in the lock cylinder, wherein the lock ring includes an aperture that slidably receives the guide piston*.

4. The lock assembly of claim [3] *1*, wherein the lock ring *is disposed in the closing chamber and* separates the closing chamber into a variable volume ring chamber and a variable volume ring fluid chamber, the ring fluid chamber fluidly connected to a ram chamber in the ram cylinder.

5. The lock assembly of claim 4, further comprising a ram piston slidably positionable in the ram cylinder and defining the ram chamber therein, the ram chamber having a variable volume.

6. The lock assembly of claim 4, further comprising a valve fluidly coupled to the ring chamber to selectively vent fluid therefrom.

7. The lock assembly of claim 1, further comprising a valve fluidly coupled to the *variable volume* lock chamber to selectively vent fluid therefrom.

8. The lock assembly of claim 1, further comprising a ram piston slidably positionable in the ram cylinder and defining a variable volume ram chamber therein, the ram chamber fluidly connectable to the closing chamber.

9. The lock assembly of claim 1, further comprising fasteners operatively connecting the lock cylinder to an end of the ram cylinder.

10. The lock assembly of claim [1] *2*, wherein guide piston is fixed.

11. The lock assembly of claim 10, further comprising a lock ring slidably positionable along the fixed guide piston.

12. The lock assembly of claim 10, wherein an end of the guide piston is slidably receivable into [a] *the* guide cavity of the lock piston.

13. A blowout preventer for sealing about a tubular extending from a wellbore of a wellsite, the blowout preventer comprising:

a housing having a bore and a channel therethrough, a tubular positionable through the bore and engageable therein;

a plurality of ram assemblies slidably positionable in the channel and engageable with the tubular, each of the plurality of ram assemblies comprising*:* a ram block, a ram cylinder, and a ram shaft operatively connecting the ram block to the ram cylinder; and a plurality of locking assemblies for locking the plurality of ram assemblies, each of the plurality of locking assemblies comprising:

a lock cylinder operatively connectable the ram cylinder, the ram shaft having an end slidably extendable into a lock cavity of the lock cylinder;

a lock piston slidably positionable in the lock cylinder and separating the lock cavity into a variable volume lock chamber and a variable volume closing chamber, the lock piston movable between a locked and unlocked position, the lock piston having a ram surface engageable with the end of the ram shaft when the lock piston is in the locked position and having a ram hole therethrough to receive the end of the ram shaft when the lock piston is in the unlocked position whereby the ram block is selectively lockable about the tubular; and a ram valve triggered upon abutment with a ram shaft to selectively [vent] *input pressurized* fluid [from] *into* the variable volume lock chamber.

14. The blowout preventer of claim 13, wherein at least one of the *variable volume* lock chamber, the closing chamber and combinations receive fluid therein and selectively providing fluid pressure thereto.

15. The blowout preventer of claim 13, further comprising an actuator operatively connectable to one of the blowout preventer, the plurality of ram assemblies, the plurality of lock assemblies and combinations thereof for selective activation thereof.

16. The blowout preventer of claim 13, further comprising a door positionable about each of the plurality of ram assemblies and the channel and providing selective access thereto.

17. A method of locking a blowout preventer of a wellsite having a tubular extending from a wellbore, the blowout preventer comprising a housing and a ram assembly, the housing having a bore and a channel therethrough, the tubular positionable through the bore and engageable therein, the ram assembly slidably positionable in the channel and engageable with the tubular, the ram assembly comprising a ram block, a ram cylinder, and a ram shaft operatively connecting the ram block to the ram cylinder, the method comprising:

providing a lock assembly about the ram assembly, the lock assembly comprising:

a lock cylinder operatively connectable to the ram cylinder, the ram shaft having an end slidably extendable into a lock cavity of the lock cylinder;

a lock piston slidably positionable in the lock cylinder and separating the lock cavity into a variable volume lock chamber and a variable volume closing chamber, the lock piston movable between a locked and unlocked position, the lock piston having a ram surface engageable with the end of the ram shaft when the lock piston is in the locked position and having a ram hole therethrough to receive the end of the ram shaft when the lock piston is in the unlocked position; and a ram valve triggered upon abutment with a ram shaft to selectively [vent] *input pressurized* fluid [from] *into* the variable volume lock chamber; and selectively locking the ram block about the tubular by selectively applying pressure to one of the *variable volume* lock chamber and the closing chamber.

18. The method of claim 17, wherein the lock assembly further comprises*:* a guide piston extending into a cavity in the lock piston and slidably engageable therewith*;* and

[a lock] *a locking ring moveably disposed in the lock cylinder, wherein the locking* ring *is* slidably positionable in the closing chamber [about the lock piston, the method further comprising increasing a force of the lock piston by slidably moving the lock ring adjacent the lock piston] *and includes an aperture that slidably receives the guide piston*.

19. The method of claim 17, further comprising selectively venting fluid from one of the *variable volume* lock chamber, the closing chamber and combinations thereof.

20. The method of claim 17, further comprising moving the ram block by fluidly coupling the closing chamber to a ram chamber in the ram cylinder to selectively drive a ram piston therein.

* * * * *